US006499331B2

(12) United States Patent
Moilanen et al.

(10) Patent No.: US 6,499,331 B2
(45) Date of Patent: Dec. 31, 2002

(54) PARTS STAMPER

(75) Inventors: Steven M. Moilanen, Fort Wayne, IN (US); Bruce D. McIntosh, Monroeville, IN (US)

(73) Assignee: PHD, Inc., Fort Wayne, IN (US)

( * ) Notice: Subject to any disclaimer, the term of this patent is extended or adjusted under 35 U.S.C. 154(b) by 0 days.

(21) Appl. No.: 09/996,203

(22) Filed: Nov. 28, 2001

(65) Prior Publication Data

US 2002/0035862 A1 Mar. 28, 2002

Related U.S. Application Data

(63) Continuation of application No. 09/677,661, filed on Oct. 2, 2000, now Pat. No. 6,324,886, which is a continuation-in-part of application No. 09/212,722, filed on Dec. 16, 1998, now Pat. No. 6,125,684.

(60) Provisional application No. 60/069,970, filed on Dec. 18, 1997.

(51) Int. Cl.[7] .................. H01R 43/042; B21D 28/10; B23P 11/00

(52) U.S. Cl. .................. 72/453.16; 72/325; 72/407; 72/452.8; 81/313; 101/3.1

(58) Field of Search .................. 72/409.08, 409.16, 72/453.16, 452.8, 407, 325; 101/3.1; 81/313

(56) References Cited

U.S. PATENT DOCUMENTS

| | | | | |
|---|---|---|---|---|
| 1,394,333 A | * | 10/1921 | Nagy | 101/3.1 |
| 2,011,877 A | | 8/1935 | Shaff | |
| 2,040,749 A | * | 5/1936 | Linn | 101/3.1 |
| 2,348,566 A | * | 5/1944 | Papazian | 101/3.1 |
| 2,396,562 A | | 3/1946 | Forss | |
| 3,037,208 A | | 6/1962 | Haberstump | |
| 3,044,074 A | | 7/1962 | Tebb et al. | |
| 3,972,218 A | | 8/1976 | Pawloski | |
| 4,204,468 A | | 5/1980 | Harrison | |
| 4,378,733 A | | 4/1983 | Polad et al. | |
| 4,480,460 A | | 11/1984 | Bush et al. | |
| 4,483,056 A | | 11/1984 | Schwalm et al. | |
| 4,571,975 A | | 2/1986 | Pawloski et al. | |
| 5,040,278 A | | 8/1991 | Eckold et al. | |
| 5,653,140 A | | 8/1997 | West | |
| 5,839,316 A | | 11/1998 | Kolivoski et al. | |
| 6,125,684 A | * | 10/2000 | Moilanen et al. | 72/453.16 |
| 6,324,886 B1 | * | 12/2001 | Moilanen et al. | 72/453.16 |

FOREIGN PATENT DOCUMENTS

| | | |
|---|---|---|
| GB | 2 093 773 A | 9/1982 |
| WO | WO 84/02307 | 6/1984 |

* cited by examiner

*Primary Examiner*—David Jones
(74) *Attorney, Agent, or Firm*—Barnes & Thornburg

(57) ABSTRACT

A parts stamper which includes a pair of jaw members, including at least one movable jaw member. The movable jaw member(s) include(s) a cam bearing. The parts stamper includes an actuator which is coupled to a cam element. The cam element cooperates with the cam bearings of the jaw member(s) to cause the jaw members to open and close. The jaw members include tool seats in which various tools can be secured, including an anvil and a number backing plate.

10 Claims, 18 Drawing Sheets

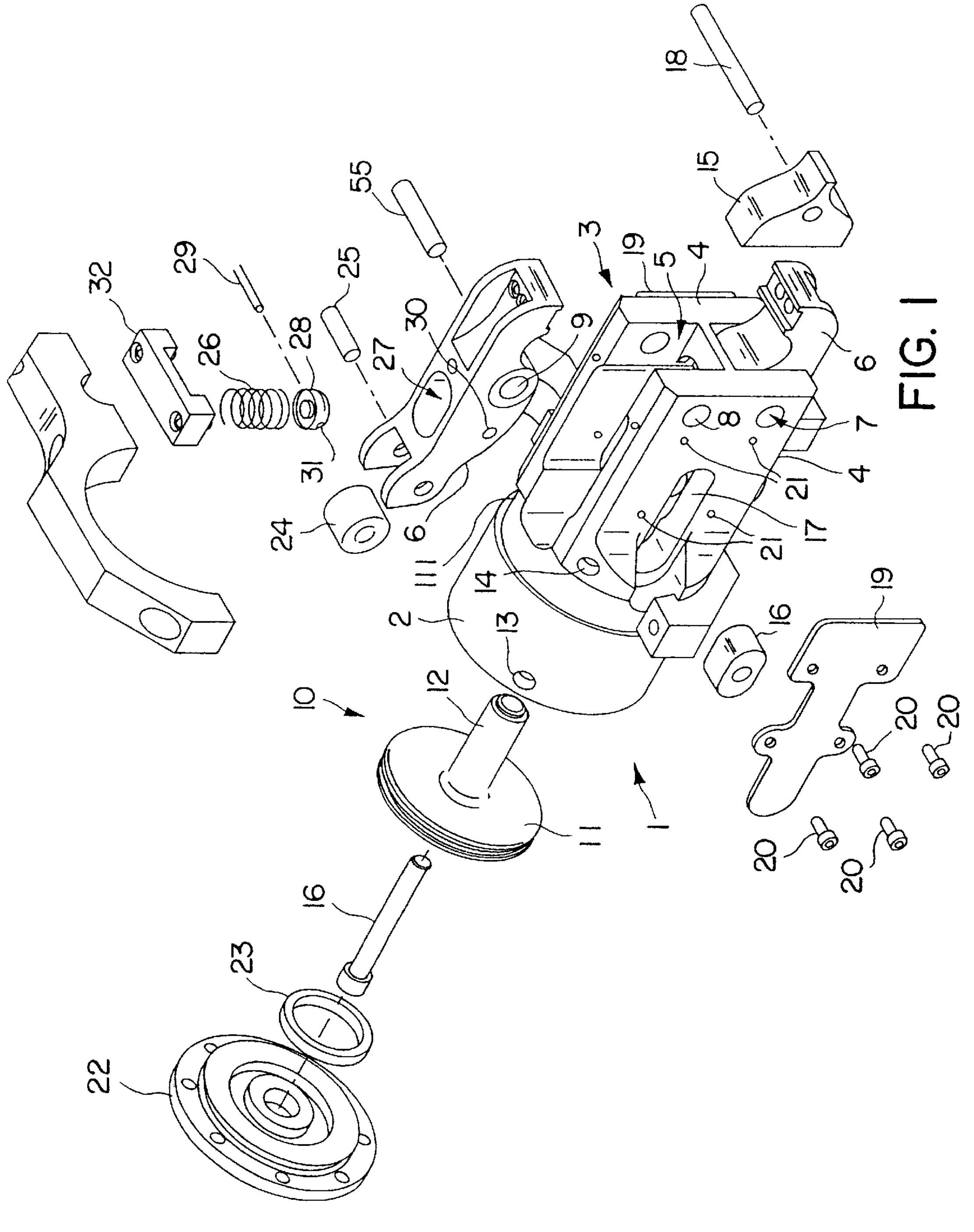
FIG. I

PARTS STAMPER

RELATED APPLICATION

This application is a Continuation of U.S. Utility patent application Ser. No. 09/677,661, filed Oct. 2, 2000, now U.S. Pat. No. 6,324,886 B1, which is a Continuation-in-Part of U.S. Utility patent application Ser. No. 09/212,722, filed Dec. 16, 1998 now U.S. Pat. No. 6,125,684, which is related and claims priority to U.S. Provisional Patent Application Ser. No. 60/069,970, filed Dec. 18, 1997, the complete disclosure of which is hereby expressly incorporated by reference.

TECHNICAL FIELD

The present invention relates to methods and apparatus which are used to imprint indicia onto objects. More particularly, the present invention relates to parts stampers which are used to stamp part numbers or similar indicia into metal parts.

BACKGROUND ART

Many devices are manufactured from a number of component parts. It is often necessary to identify such component parts for purposes of repair or replacement purposes. In some cases, manufacturing processes require the identification of component parts which are made by separate fabrication processes or by different vendors. For example, automobiles and trucks are assembled from a number of component parts which require identification. Such identification enables tracking of inventory and is particularly useful when various common parts are used to manufacture different vehicle models.

In the case of stamped parts, such as automobile or truck body parts, part numbers or identification codes have conventionally been imprinted or stamped into the parts. This has been achieved by including a numeral or code stamp in the die member used to stamp the part. One disadvantage with such an assembly is that in order to change a part number or code, the numeral or code stamp has to be changed or replaced. In order to safely change or replace the numeral or code stamp, the die members have to be blocked so as to prevent accidental injury to whomever changes or replaces the numeral or code stamp. This can become time consuming, especially when large dies such as those used to form automobile or truck bodies are involved.

The present invention is directed at a modular parts stamper which can be used to imprint indicia into various metal and non-metal parts.

DISCLOSURE OF THE INVENTION

According to other features, characteristics, embodiments, alternatives and equivalents, the present invention provides a parts stamper which includes:

- a body having a yoke structure defined at one end by a pair of spaced-apart wall members and an actuator at an opposite end;
- a pair of opposable jaw members, each jaw member including a cam roller bearing at one end and tool seats at opposite ends;
- a cam element which contacts the cam roller bearings of the pair of jaw members; and
- a linkage structure driven by the actuator and coupled to the cam element.

The present invention further provides a parts stamper which includes:

- a body having a yoke structure defined at one end by a pair of spaced-apart wall members and an actuator at an opposite end;
- a pair of jaw members having tool seats on one end, including at least one pivotal jaw member which includes a cam roller bearing at an opposite end from the tool seat;
- a cam element which contacts each cam roller bearing of the pair of jaw members; and
- a linkage structure driven by the actuator and coupled to the cam element.

BRIEF DESCRIPTION OF DRAWINGS

The present invention will be described hereafter with reference to the attached drawings which are given as non-limiting examples only, in which:

FIG. 1 is an exploded view of a parts stamper according to one embodiment of the present invention.

BEST MODE FOR CARRYING OUT THE INVENTION

Figure 2B:
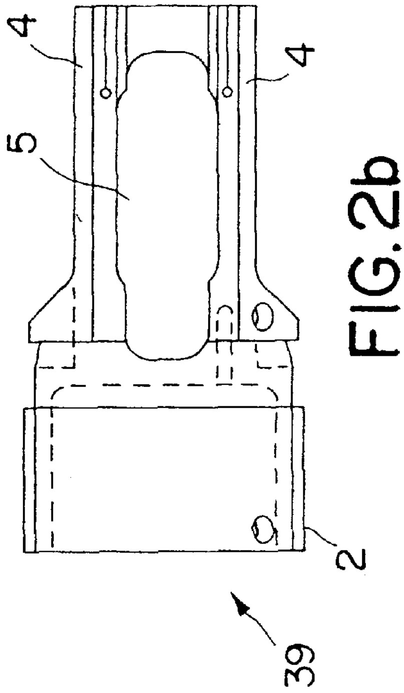
FIG. 2*b* is a side view of the stamper body of FIG. 2*a* which looks through the opening in the yoke structure.

The present invention is directed to a mechanical parts stamper which can be used to imprint indicia such as a numeric, alphabetic, logo, or other code onto metal and non-metal parts. The parts stamper of the present invention includes a pair of opposable jaw members, between which a part can be received and stamped so as to be imprinted with indicia. One or both of the opposable jaw members may be movable to effect the imprinting of indicia. Movement of the jaw member or members can be effected by a number of different types of actuators, including fluid pressure such as pneumatic or hydraulic pressure, electromechanical, mechanical, electromagnetic, etc.

Indicia is provided as a die or die set block which is secure in one of the opposable jaws. Such die and die sets are known in the art, howbeit their use in opposable jaws of part stampers is not conventional.

According to one embodiment of the present invention, the parts stamper includes a pneumatic or hydraulic differential motor which drives a piston rod in a reciprocal fashion, and a pair of opposable jaws which are attached to the piston rod by a mechanical linkage that effects the opening and closing of the opposable jaws, as well as the pressure exerted between the jaws. The mechanical linkage includes a cam member which cooperates with cam roller bearings that are coupled to the movable jaw members to cause the movable jaw members to pivot between an open and closed position. According to various embodiments, either one or both of the jaw members can be movable, i.e., pivotal. In the case wherein one of the opposable jaws is not movable, the cam member can be shaped to only cause the other jaw member to pivot. Otherwise, the non-movable or stationary jaw member is fixed and may or may not include a cam roller bearing which cooperates with the cam member.

The jaw members are pivotally secured to a body in which the pneumatic or hydraulic differential motor is formed. The movable jaw members are spring biased so that they return to their open position when no other force is applied thereto.

FIG. 1 is an exploded view of a parts stamper according to one embodiment of the present invention. As depicted, the parts stamper includes a body 1 having a base 2 and a yoke structure 3 which extends from the base 2. The yoke structure 3 is defined by two legs 4 which extend substantially parallel from the base 2, and define an opening 5 therebetween.

A pair of jaw members 6 are received in opening 5 of the yoke structure 3, between legs 4. The jaw members 6 are pivotally-coupled to the yoke structure 3 by jaw pivot pins 7 which extend through aligned through-bores 8 in the legs 4 of the yoke structure 3 and through-bores 9 in the jaw members 6.

As discussed below, the base 2 of the stamper body includes a fluid chamber and a piston assembly which drives the jaw members 6. FIG. 1 depicts piston assembly 10 as including base 11 and piston rod 12. The piston 10 is driven in a reciprocal manner in the fluid chamber by applying fluid pressure to ports 13 and 14 in a known manner.

A cam element 15 which drives the pivotal opening and closing of the jaw members 6 is coupled to piston rod 12. For example, a fastener 16 having threads on a distal end can be inserted through a central bore in piston assembly 10 and into a threaded bore in the base of cam member 15. Movement of cam member 15 is guided by cam bushings 116. Cam bushings 116 are received in elongated slots 17 that are formed in the legs 4 of the yoke structure 3. Cam member 15 is coupled on either side to cam bushings 116 by a pin 18. As discussed in detail below, cam bushings 116 and pin 18 are secured in place by impact plates 19 which can be attached to the legs 4 of the yoke structure 3 by fasteners 20 which are received into threaded bores 21. As seen on the right-hand side of the stamper of FIG. 1, the impact plates 19 extend beyond the end of the legs 4 of the yoke structure 3, and, thus, protect the face of the yoke structure from being impacted by articles that are to be stamped.

An end cap 22 is used to close and seal the rear of the fluid chamber which houses piston assembly 10. This end cap 22 can be fastened to the base 2 by suitable mechanical fasteners (not shown). Reference numeral 23 in FIG. 1 identifies a shock absorbing element which is coupled to the inner face of end cap 22 and used to absorb the shock or impact of the piston 10 as it moves rearwardly.

The rear end of each movable jaw member 6 includes a cam roller bearing 24 which is secured in a yoke portion of the jaw members 6 by a pin 25. The cam element 15 cooperates with cam roller bearings 24 to push the lower or rear ends of the movable jaw members 6 outward as the piston assembly 10 and cam element 15 move upward or forward. This causes the jaw members 6 to pivot about jaw pivot pins 7 so that the free ends of the movable jaw members 6 move together.

The jaw members 6 are biased so that they return to their open position when the cam element 15 is retracted by piston assembly 10. Suitable biasing force can be applied by spring elements 26 which are received in spring receiving holes 27 that are formed in the outer sides of each jaw member 6. One end of the spring elements is retained in spring retainer cups 28. Spring retainer cups 28 are pivotally-coupled to jaw members 6 within spring receiving holes 27 by pins 29 which pass though bores 30 in the jaw members 6 and a bore 31 in the spring retainer cups 28. The opposite end of the spring elements 26 are retained in position by spring retaining caps 32 which are fastened, e.g., bolted, to the legs 4 of the yoke structure 3.

Figure 2D:
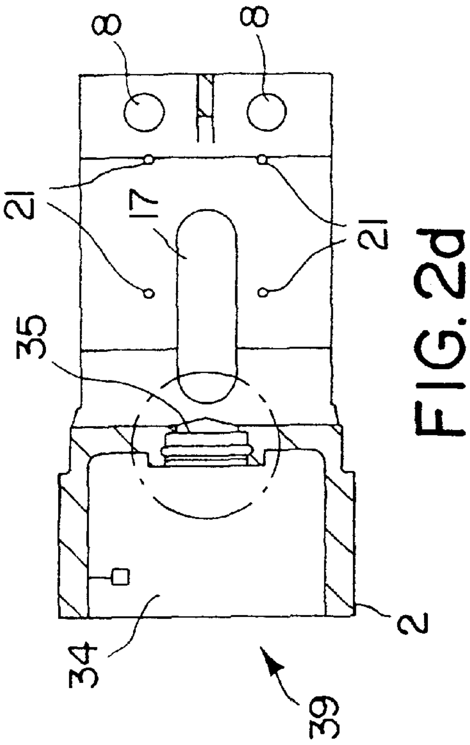
FIG. 2*d* is a cross-sectional view of the body taken along plane A—A of FIG. 2*b*.
Figure 2A:
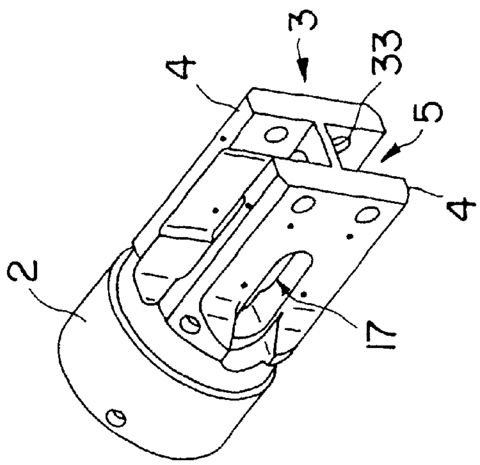
FIG. 2*a* is a perspective view of the stamper body according to one embodiment of the present invention.

FIG. 2*a* is a perspective view of the stamper body according to one embodiment of the present invention. FIG. 2*a* does not include the jaw members 6 or other elements in the yoke structure 3, and, thus, provides a clear view of the structure of the stamper body according to one embodiment. It is noted that the yoke structure 3 can include an integral cross piece member 33 adjacent the free end thereof. This cross piece member can be included to provide additional stability to the body structure.

FIG. 2*b* is a side view of the stamper body of FIG. 2*a* which looks through the opening in the yoke structure 3. The width of opening 5 between the two legs 4 of the yoke structure 3 should be sufficient to provide clearance so that the movable jaw members 6 can pivot between their open and closed positions. Generally opening 5 can have a rectangular shape, at least in the central portion, as shown. Since less clearance is required for the cam element 15 in some embodiments, the lower portion of opening 5 can be narrower than the central portion as shown.

Figure 2C:
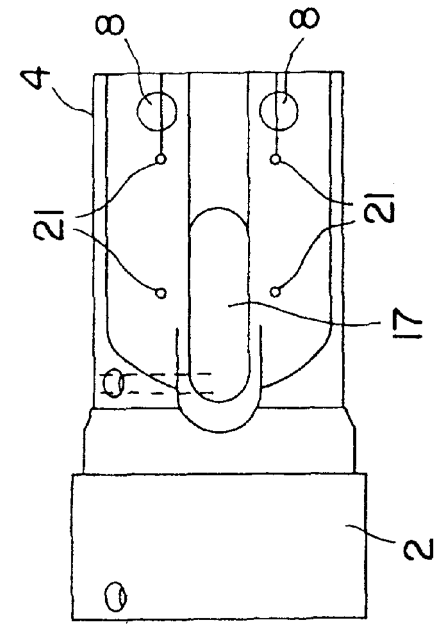
FIG. 2*c* is a side view of the stamper body of FIG. 2*a* which is parallel to one of the sides of the yoke structure.

FIG. 2*c* is a side view of the stamper body of FIG. 2*a* which is taken parallel to one of the sides of the yoke structure 3. As depicted in FIG. 2*b*, each of the two legs 4 of the yoke structure 3 includes an elongated slot 17. These elongated slots 17 in each of the legs 4 of the yoke structure 3 are parallel to one another and parallel to the central axis of the stamper body. Elongated slots 17 are dimensioned to receive cam bushings 116 which guide movement of a cam element 15 as discussed herein. The legs 4 of the yoke structure 3 are provided with through-bores 8 through which jaw pivot pins 7 can be inserted and used to pivotally-couple movable jaw members 6 to the yoke structure 3. The jaw pivot pins 7 and cam bushings 116 can be retained in the yoke structure 3 by impact plates 19 which are secured to the sides of the legs 4 of the yoke structure 3 by threaded fasteners which are received in threaded bores 21.

FIG. 2*d* is a cross-sectional view of the body taken along plane A—A of FIG. 2*b*. FIG. 2*d* depicts the structure of a fluid, i.e., pneumatic or hydraulic cylindrical chamber 34 which is formed in the base 2 of stamper body. An opening 35 is provided in the front wall of the cylindrical chamber 34 to allow a piston rod 12 to pass therethrough and move in a reciprocal manner in opening 5 of the yoke structure 3. The opening 35 is provided with a stepped passageway so that an appropriate seal can be received therein.

Figure 3C:
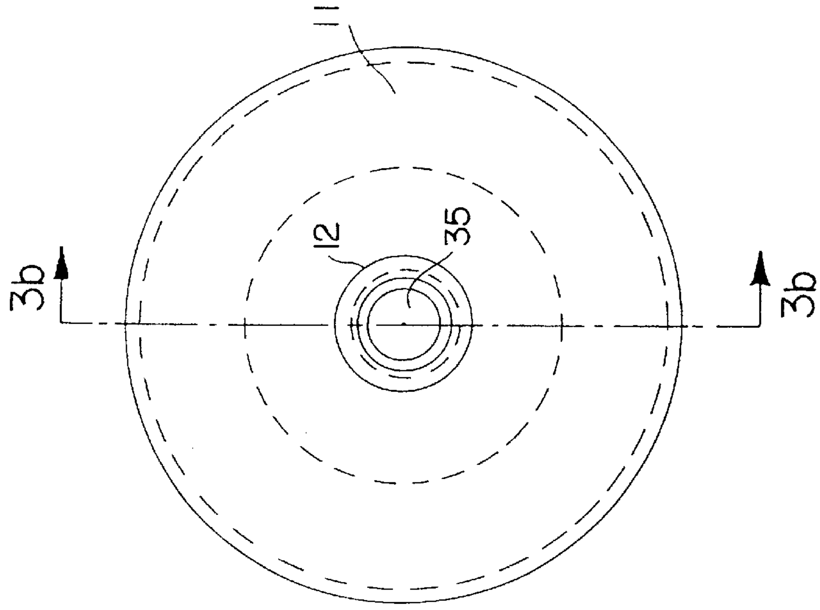
FIG. 3*c* is an end view of the piston of FIG. 3*a*.
Figure 3B:
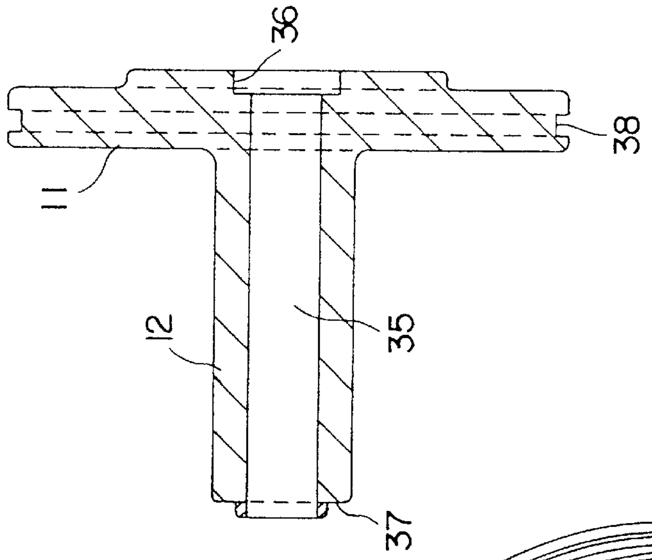
FIG. 3*b* is a cross-sectional view of the piston of FIG. 3*a*.
Figure 3A:
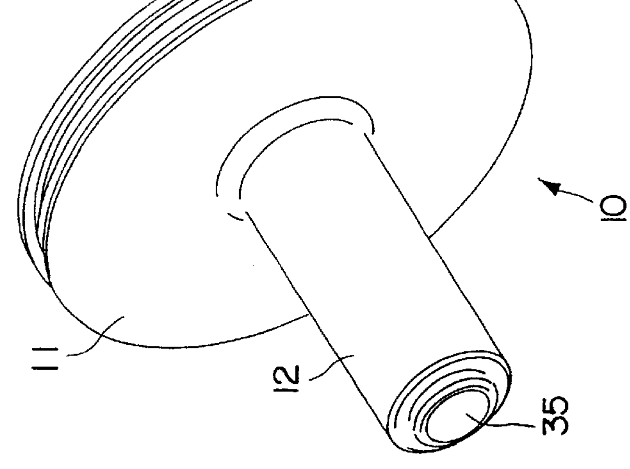
FIG. 3*a* is a perspective view of a piston according to one embodiment of the present invention.

FIG. 3*a* is a perspective view of a piston according to one embodiment of the present invention. As depicted, the piston assembly 10 includes a base 11 which is dimensioned to be received in the cylindrical chamber 34, and a piston rod 12 which extends from base 11. The piston rod 12 is provided so that the piston assembly 10 can be coupled to a cam element 15.

FIG. 3*b* is a cross-sectional view of the piston of FIG. 3*a*. As depicted in FIG. 3*b*, a central through-bore 35 extends through the base 11 of the piston assembly 10 and the piston rod 12. This through-bore 35 is provided to receive a mechanical fastener 16 (FIG. 1) which can be inserted through the base 11 of the piston assembly 10 and piston rod 12, and used to couple the cam element 15 thereto. As depicted, through-bore 35 is preferably provided with a stepped portion 36 in the base 11 of the piston assembly 10 so that the mechanical fastener 16 can be counter-sunk therein. The free end of the piston rod 12 can be provided with a stepped portion 37 as depicted. This stepped portion 37 can be received in a correspondingly-shaped bore in the bottom of cam element 15.

FIG. 3*c* is an end view of the piston of FIG. 3*a*. FIG. 3*c* and FIGS. 3*a* and 3*b* depict a peripheral groove 38 which is formed on the base 11 of piston assembly 10. This groove 38 is provided to receive a seal member which provides a sealing fit between the piston base 11 and inner wall of cylindrical chamber 34.

Figure 4B:
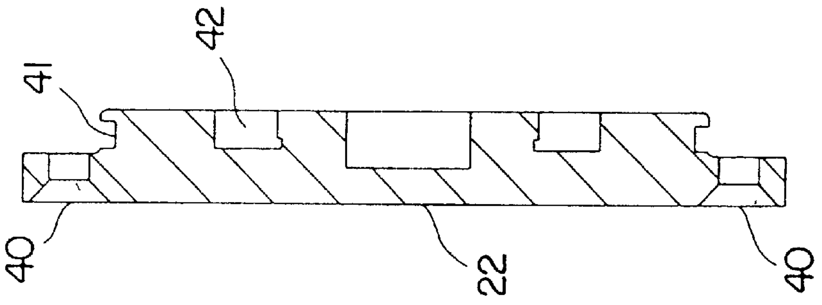
FIG. 4*b* is a cross-sectional view of the end cap of FIG. 4*a*.
Figure 4A:
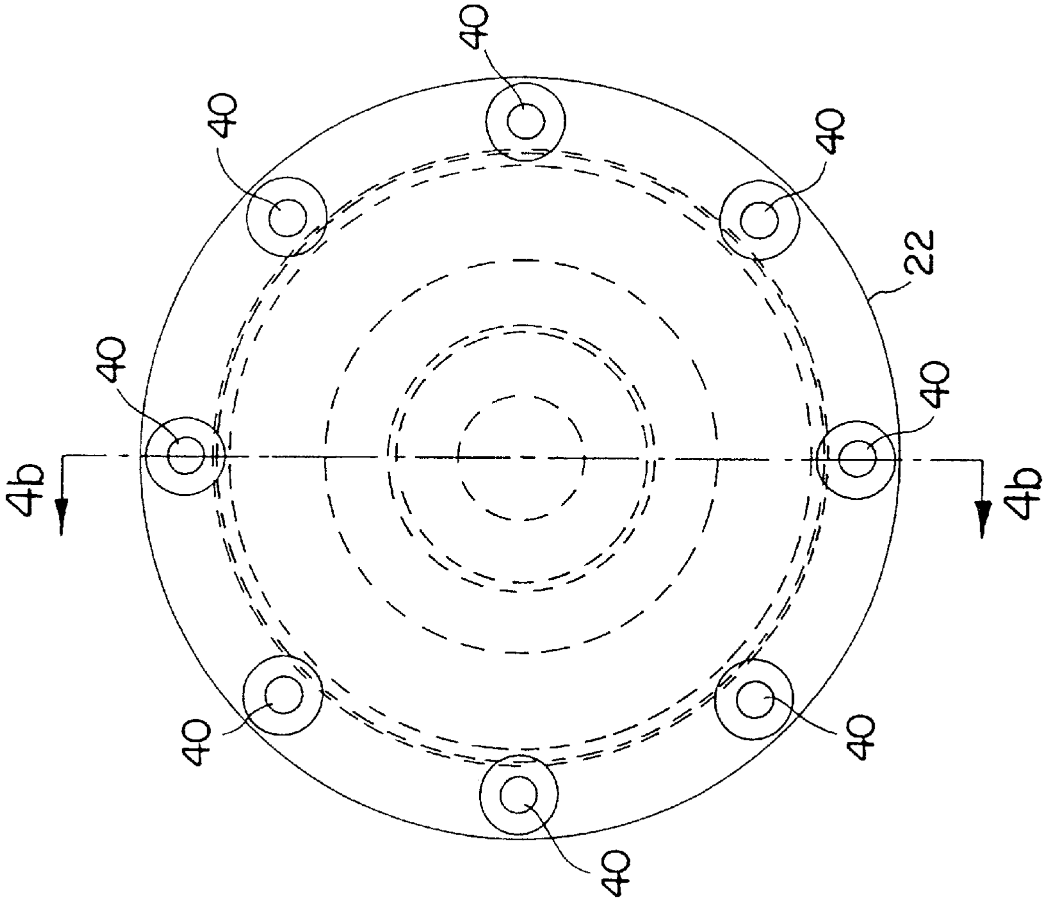
FIG. 4*a* is an end view of the end cap of the stamper body according to one embodiment of the present invention.

FIG. 4*a* is an end view of the end cap of the stamper body according to one embodiment of the present invention. The open end 39 of cylindrical chamber 34 depicted in FIG. 2*d* is sealed by means of end cap 22. End cap 22 can be secured to base 2 by threaded fasteners (not shown) which pass through bores 40 and are received in correspondingly-aligned threaded bores in the end of base 2 (not shown).

FIG. 4*b* is a cross-sectional view of the end cap of FIG. 4*a*. As shown in FIG. 4*b*, a groove 41 is provided in a peripheral surface of end cap 22. This groove 41 is designed to receive a sealing fit member, such as an o-ring, which provides a seal between end cap 22 and cylindrical chamber 34. As further depicted in FIG. 4*b*, an annular groove 42 is provided in the inner face of end cap 22. This annular groove 42 is designed to receive a shock absorber 23 (FIG. 1) which arrests the rearward movement of the piston and/or absorbs the momentum thereof. Such a shock absorber 23 can include an annular elastic member, a spring member, or similar structure.

Figure 5C:
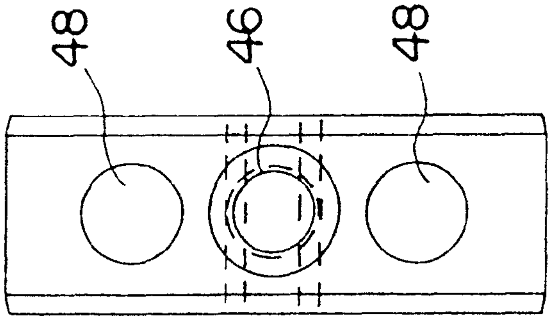
FIG. 5*c* is an end view of the cam element of FIG. 5*a*.
Figure 5B:
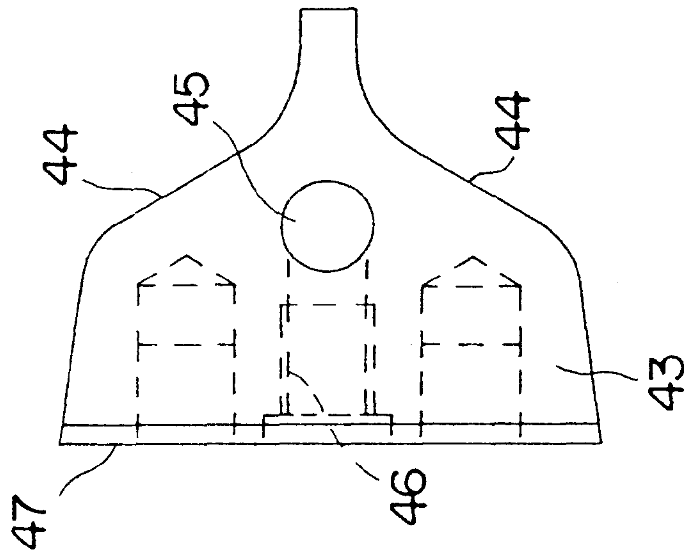
FIG. 5*b* is a side view of the cam element of FIG. 5*a*.
Figure 5A:
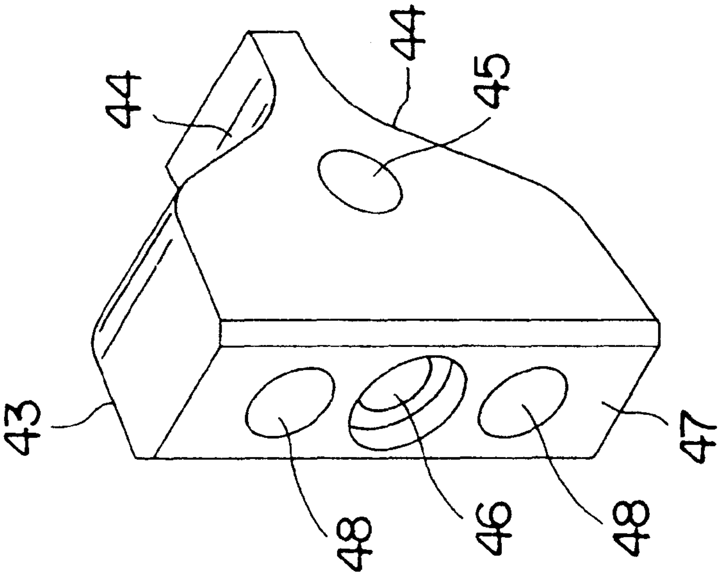
FIG. 5*a* is a perspective view of a cam element according to one embodiment of the present invention.
Figure 5E:
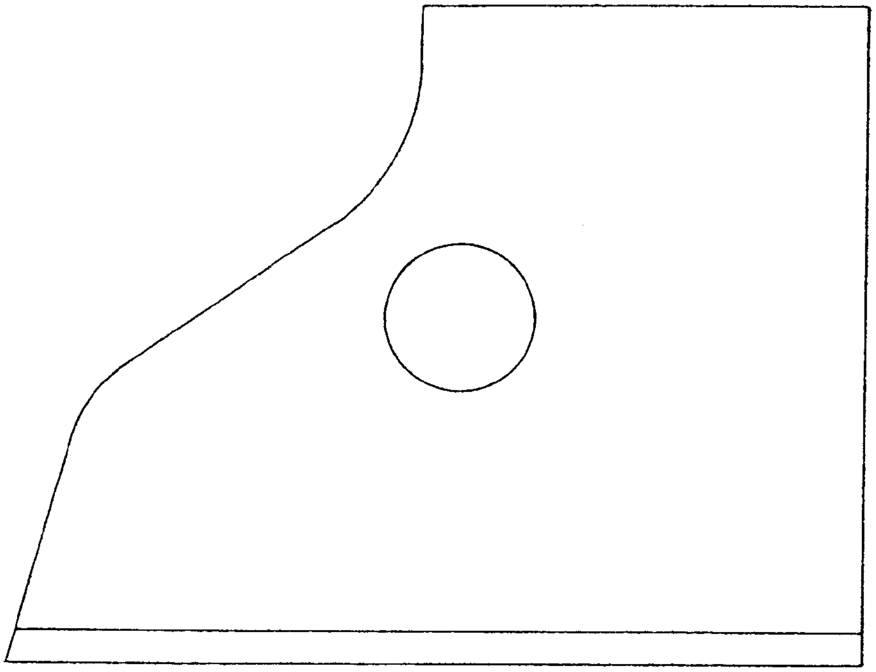
FIG. 5*e* is a side view of a cam used to achieve a stationary jaw member.
Figure 5D:
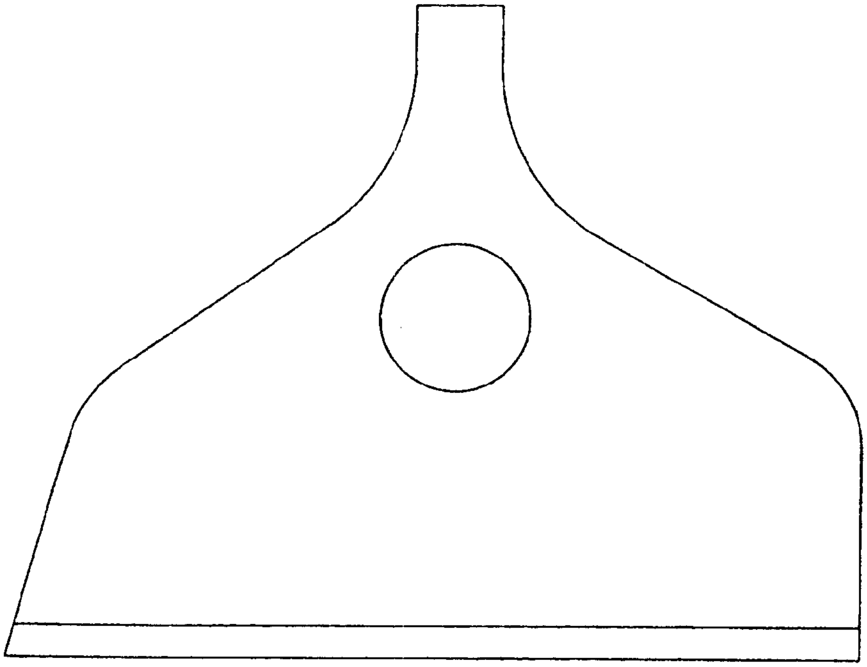
FIG. 5*d* is a side view of a cam having asymmetrical cam surfaces.

FIG. 5*a* is a perspective view of a cam element according to one embodiment of the present invention. FIG. 5*b* is a side view of the cam element of FIG. 5*a*. As depicted in FIGS. 5*a* and 5*b*, the cam element 15 includes a base 43 and two cam surfaces 44. The base 43 is designed to allow cam element 15 to be coupled to the piston rod 12. The cam surfaces 44 are configured, i.e., curved, to cooperate with the cam roller bearings 24 which are coupled to movable jaw members 6 as discussed below. The leading end of the cam element 15 is narrow and designed to remain in position between the cam roller bearings 24 that are coupled to the movable jaw members 6. This narrow portion widens toward the rear or bottom of the cam element 15 as depicted, so that as the cam element 15 is pushed forward by the piston assembly 10, it pushes cam roller bearings 24, and, thus, the lower portions of the movable jaw members 6 outward. This outward movement causes the movable jaw members 6 to pivot so that the free ends thereof close together. Thus, it is to be understood that the curved shape of the sides of the cam element 15 affects the speed at which the movable jaws 6 close and open and the amount of pressure applied between the ends of the movable jaw members 6. Thus, the cam surfaces 44 can be symmetrical as depicted or asymmetrical, and can be dependently or independently shaped as desired to increase or decrease jaw movement and grip force.

FIG. 5*b* is an end view of the cam element of FIG. 5*a*. As depicted in FIG. 5*b*, the cam member includes a through-bore 45 which extends through the sides thereof. This through-bore receives a pin 18 (FIG. 1) which couples the cam element 15 to cam bushings 116. As discussed above, cam bushings 116 move along elongated slots 17 formed in the legs 4 of the yoke structure 3 of the stamper body, and, thus, guide the movement of the cam member 15. FIG. 5*b* further depicts a threaded bore 46 that is located in the rear or bottom surface 47 of cam element 15. This threaded bore 46 is used to couple the cam element 15 to piston rod 12 as discussed above. It is noted that there are additional bores 48 as depicted in FIG. 5*a*. These bores 48 are merely provided to reduce the weight of the cam element 15.

Figure 6C:
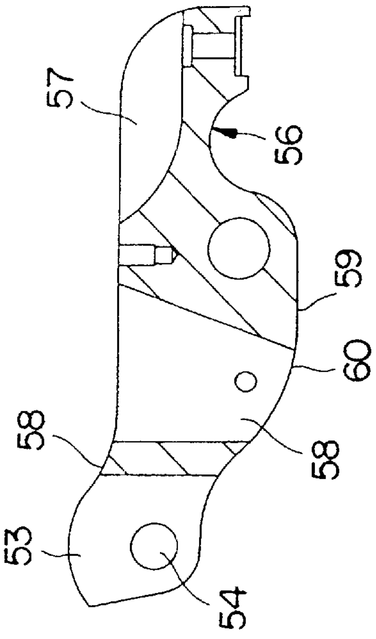
FIG. 6*c* is a cross-sectional view of the movable jaw member of FIG. 6*b* taken along plane A—A.
Figure 6B:
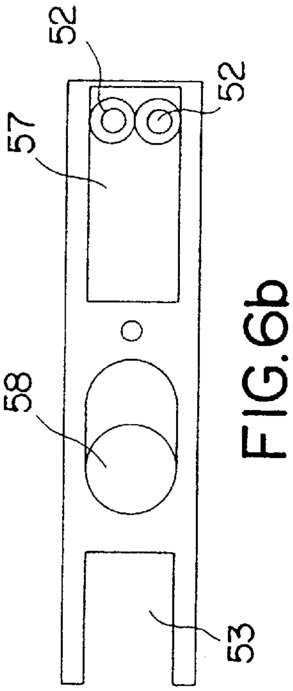
FIG. 6*b* is a side view of the movable jaw member of FIG. 6*a*.
Figure 6A:
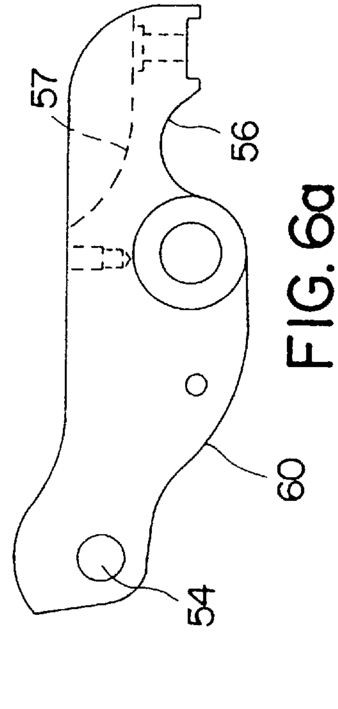
FIG. 6*a* is a front view of a movable jaw member according to one embodiment of the present invention.

FIG. 6*a* is front view of a movable jaw member according to one embodiment of the present invention. The movable jaw members 6 include tool seats 49 at their free ends which receive either a jaw anvil 50 or a number backing plate 51. As shown, tool seats 49 include through-bores 52 through which fasteners can be used to secure either a jaw anvil 50 or number backing plate 51 to the jaw members 6. The opposite end of the jaw members includes a yoke 53 and through-bores 54 by which a cam roller bearings 24 can be coupled to the jaw members 6 by means of pins 25 (FIG. 1).

A through-bore 9 is provided at the pivot point of each movable jaw member 6. This through-bore 9 is used to pivotally-couple the movable jaw members 6 to the yoke structure 3 of the stamper body. In this regard, once the through-bores 9 of the jaw members 6 are aligned with through-bores 8 in the yoke structure 3, a jaw pivot pin 55 (FIG. 1) can be inserted and thereby pivotally-couple the jaw members 6 to the yoke structure 3 of the stamper body. As depicted, a peripheral surface portion of the jaw members 6 adjacent through-bores 9 can be machined to provide this portion of the jaw members 6 with a thickness which is within close tolerances to the width of opening 5 in the yoke structure 3, where the jaw members 6 are pivotally-coupled in order to maintain alignment of the jaw members 6. A desired clearance between the jaw members 6 with respect to an article to be part stamped can be achieved in part by providing a cut-out portion 56 in the opposed surfaces of the jaw members 6.

FIG. 6*b* is a side view of the movable jaw member of FIG. 6*a*. FIG. 6*b* shows the yoke portion 53 at one end of the jaw members 6 where the cam roller bearing 24 is attached. The width of this yoke portion 53 should be slightly greater than the length of the cam roller bearing 24.

FIG. 6*b* also depicts a central cut-out portion 57 in the end of the jaw member 6 which includes tool seat 49. This cut-out portion provides weight reduction of the jaw member 6 and a planar surface adjacent through-bore 52.

A spring receiving hole 27 is provided in each jaw member 6. The spring receiving holes 27 receive jaw biasing spring elements 26 as discussed below. The spring receiving holes 27 are elongated at the outer surfaces 58 of the jaw members 6 and are substantially circular on the inner surfaces 59 as depicted, thus tapering inward.

FIG. 6*c* is a cross-sectional view of the movable jaw member of FIG. 6*b* taken along plane A—A. FIG. 6*c* depicts how the spring receiving holes 27 taper inwardly through the jaw members 6. This tapered shape allows the spring elements 26 to pivot as the jaw members 6 move between their open and closed positions. Such pivoting is necessary when the outer ends of the spring elements 26 are held in fixed positions with respect to the yoke structure 3 by the spring retaining caps 32.

Figure 7B:
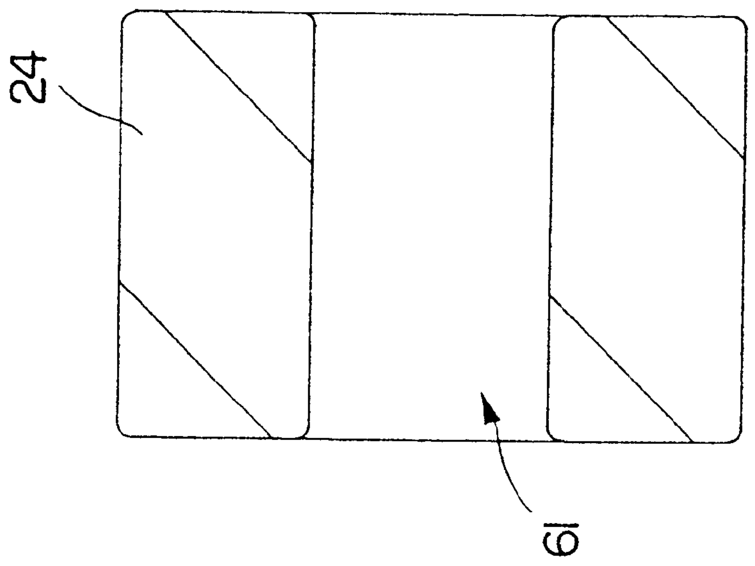
FIG. 7*b* is a cross-sectional view of the cam roller bearing of FIG. 7*a*.
Figure 7A:
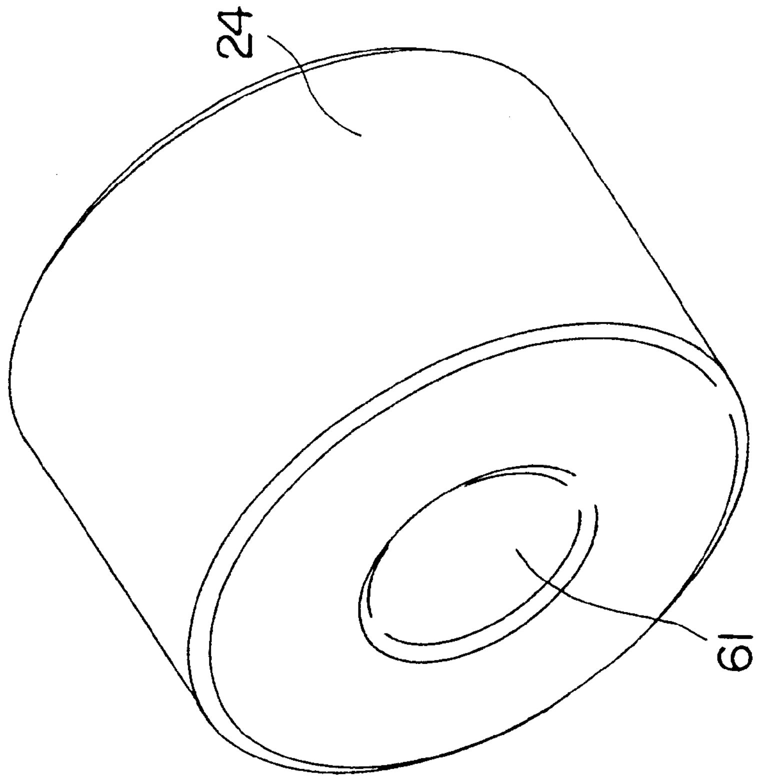
FIG. 7*a* is a perspective view of a cam roller bearing according to one embodiment of the present invention.

FIG. 7*a* is a perspective view of a cam roller bearing according to one embodiment of the present invention. FIG. 7*b* is a cross-sectional view of the cam roller bearing of FIG. 7*a*. As depicted in FIGS. 7*a* and 7*b*, the cam roller bearing 24 has a cylindrical structure with a central through-bore 61. The through-bore 61 receives a pin 25 (FIG. 1) by which cam roller bearings 24 can be coupled to movable jaw members 6 in yoke structure 3.

Figure 8C:
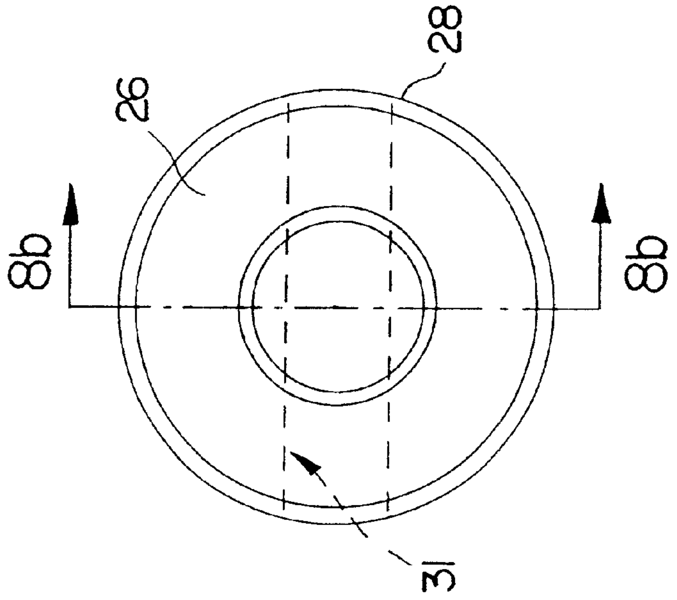
FIG. 8*c* is an end view of the spring retainer cup of FIG. 8*a*.
Figure 8B:
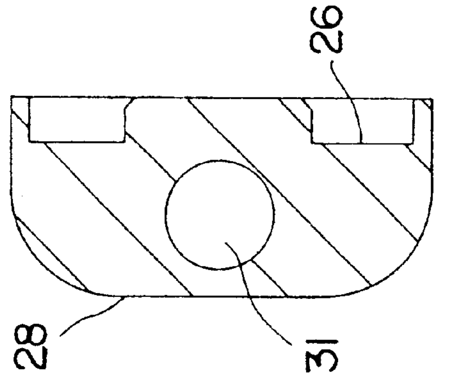
FIG. 8*b* is a cross-sectional view of the spring retainer cup of FIG. 8*a*.
Figure 8A:
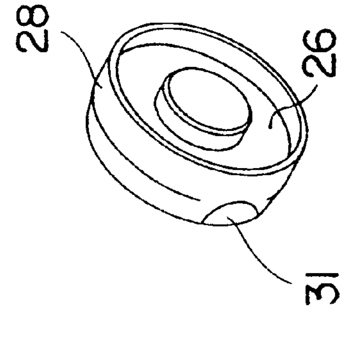
FIG. 8*a* is a perspective view of a spring retainer cup according to one embodiment of the present invention.

FIG. 8*a* is a perspective view of a spring retainer cup according to one embodiment of the present invention. FIG. 8*b* is a cross-sectional view of the spring retainer cup of FIG. 8*a*. FIG. 8*c* is an end view of the spring retainer cup of FIG. 8*a*. As depicted in FIGS. 8*a*–8*c*, the spring retainer cup 28 includes a recessed annular portion 62 for receiving therein an end of spring element 26. The central portion 63 of the recessed annular portion 62 helps center the spring element 26 in the recess. The spring retainer cup also includes a though-bore 31 which passes through the sides of the spring retainer cup 28 as depicted. As discussed above, through-bore 31 receives a pin 29 which pivotally couples the spring retainer cup 28 to the jaw members 6.

Figure 9B:
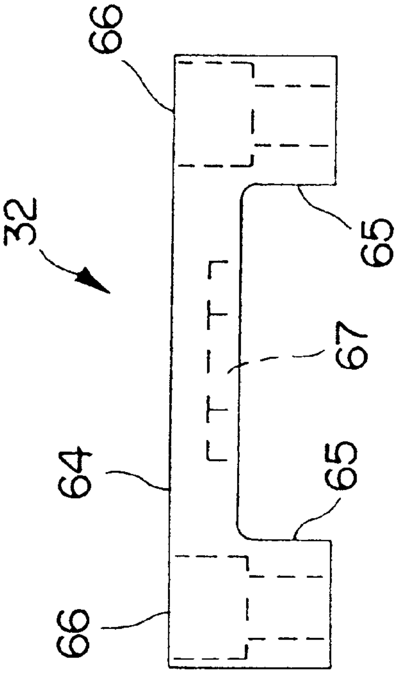
FIG. 9*b* is a side view of the spring retainer cap of FIG. 9*a*.
Figure 9C:
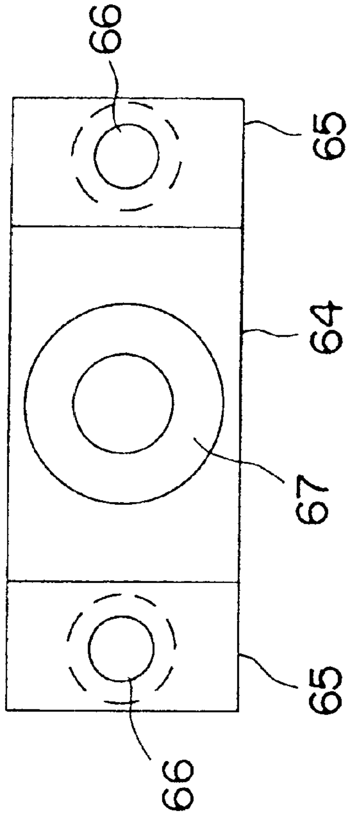
FIG. 9*c* is a bottom view of the spring retainer cap of FIG. 9*a*.
Figure 9A:
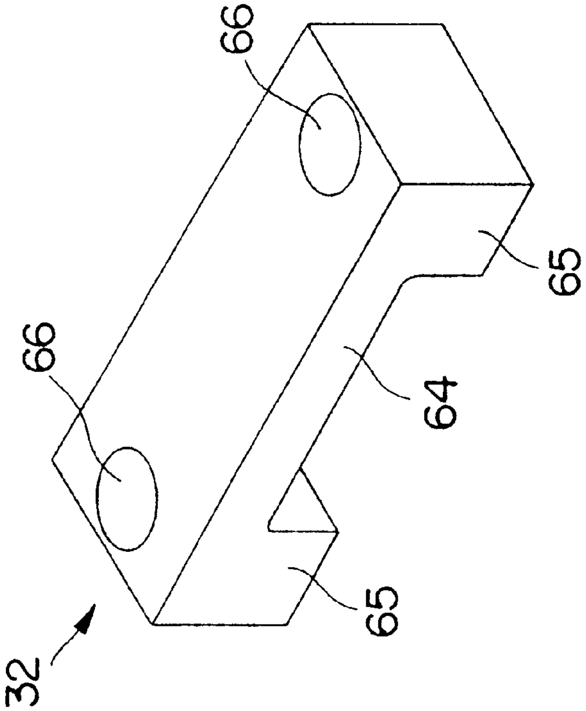
FIG. 9*a* is a perspective view of a spring retainer cap according to one embodiment of the present invention.

FIG. 9*a* is a perspective view of a spring retainer cap according to one embodiment of the present invention. FIG. 9*b* is a side view of the spring retainer cap of FIG. 9*a*. FIG. 9*c* is a bottom view of the spring retainer cap of FIG. 9*a*. The spring retainer cap 32 includes a central portion 64 and legs 65. Legs 65 include stepped though-bores 66 through which mechanical fasteners (not shown) can pass and be received in corresponding thread bores in legs 4 to fasten spring retainer caps 32 to the yoke structure 3 of the stamper body. The central portion 64 of the spring retainer caps 32 include an annular recess 67 which is similar in shape to the annular recess 26 in the spring retaining cup. The annular recesses 67 in spring retainer caps 32 receive and secure the outer ends of the spring elements 26.

Figure 10C:
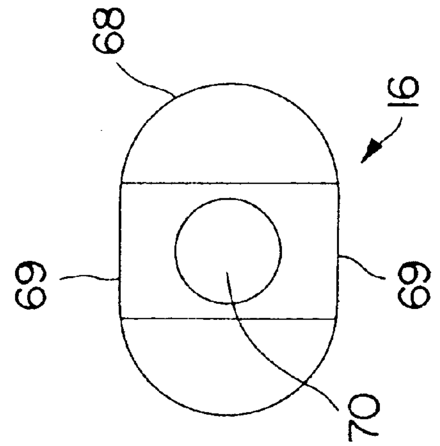
FIG. 10*c* is an end view of the cam bushing of FIG. 10*a*.
Figure 10B:
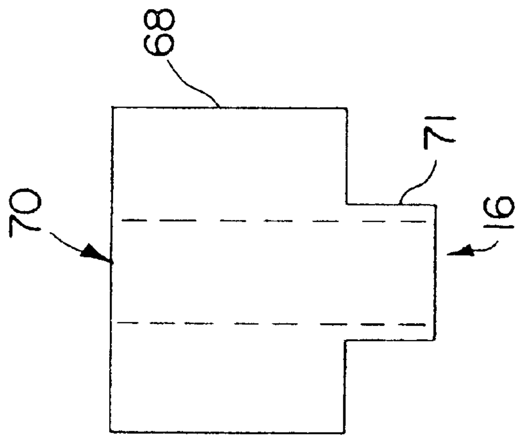
FIG. 10*b* is a side view of the cam bushing of FIG. 10*a*.
Figure 10A:
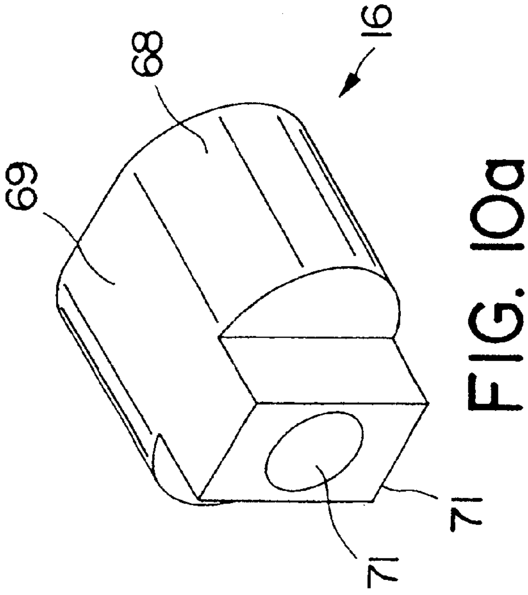
FIG. 10*a* is a perspective view of a cam bushing according to one embodiment of the present invention.

FIG. 10*a* is a perspective view of a cam bushing according to one embodiment of the present invention. FIG. 10*b* is a side view of the cam bushing of FIG. 10*a*. FIG. 10*c* is an end view of the cam bushing of FIG. 10*a*. The cam bushings 116 include an elongated portion 68 which is dimensioned to be narrow enough to fit within elongated slots 17 and elongated enough not to rotate therein. Ideally, the cam bushings 116 are made of a harder material, e.g., steel, than the stamper body (which can be made from aluminum.) Thus, the elongated portion provides flat parallel sides 69 which can slide along the inner surfaces of elongated slots 17. It has been determined that the parallel sides 69 of the cam bushings 116 reduce contact stresses induced by loads which are applied back into the stamper. That is, as opposed to circular roller bearings which provide essentially a point contact at which forces are transferred, the elongated cam bushings 116 include parallel sides along which forces are transferred. The cam bushings include a through-bore 70 which receives pin 18 as discussed above. The cam bushing depicted in FIGS. 10*a*–10*c* include a stepped portion 71 for purposes of weight reduction. Such a stepped portion can be eliminated, if desired.

Figure 11B:
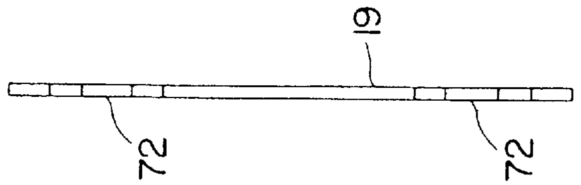
FIG. 11*b* is an end view of the impact plate of FIG. 11*a*.
Figure 11A:
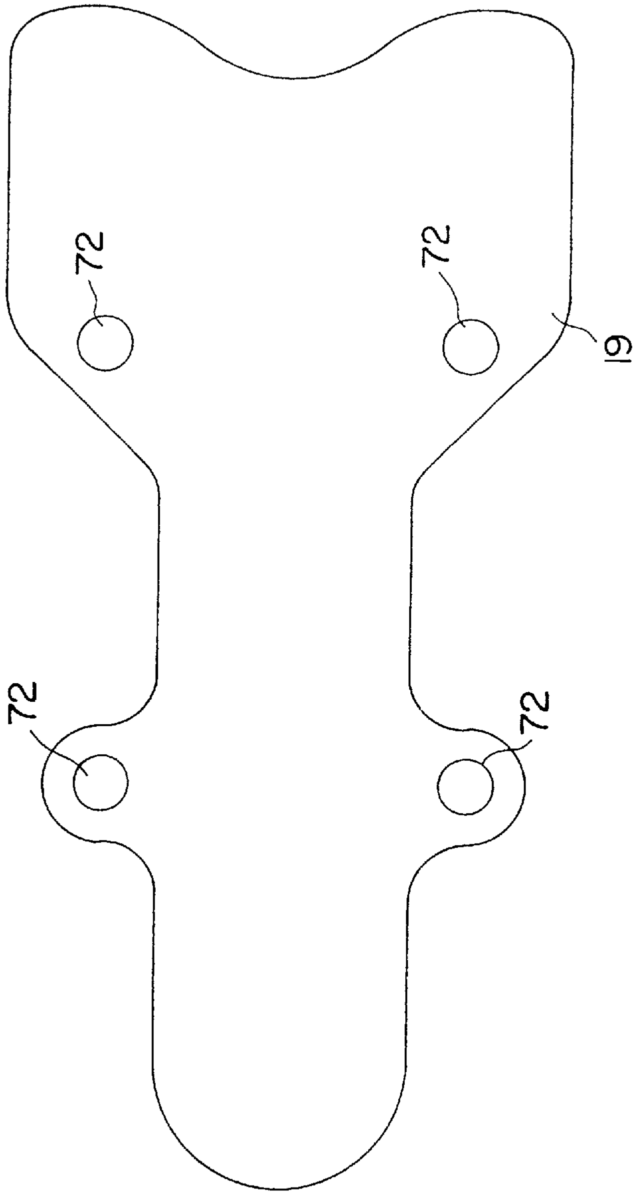
FIG. 11*a* is a side view of an impact plate according to one embodiment of the present invention.

FIG. 11*a* is a side view of an impact plate according to one embodiment of the present invention. FIG. 11*b* is an end view of the impact plate of FIG. 11*a*. The impact plates 19 are flat plates which provide a forward-striking edge which, when fastened to the yoke structure 3, can extend beyond the end of the yoke structure 3, as depicted in FIG. 1 and as discussed above. The impact plates can be made of a hardened metal if desired. The particular shape of the impact plates depicted in FIG. 11*a* is designed to cover elongated slots 17 in the yoke structure 3 and provides spaced-apart fastening holes 72 which are aligned with threaded bores 21 in the legs 4 of the yoke structure 3.

Figure 12A:
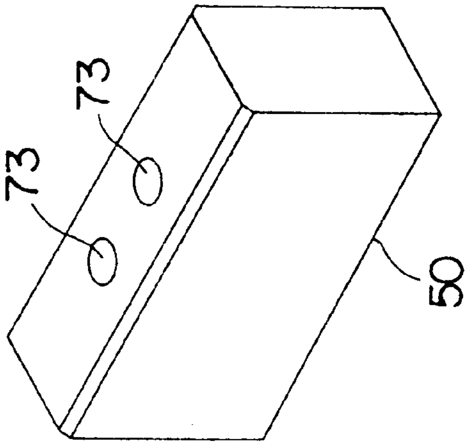
FIG. 12*a* is a perspective view of a jaw anvil according to one embodiment of the present invention.
Figure 12B:
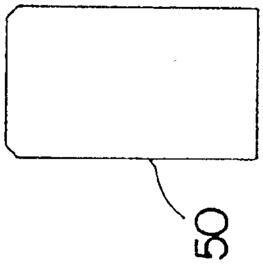
FIG. 12*b* is a front view of the jaw anvil of FIG. 12*a*.
Figure 12C:
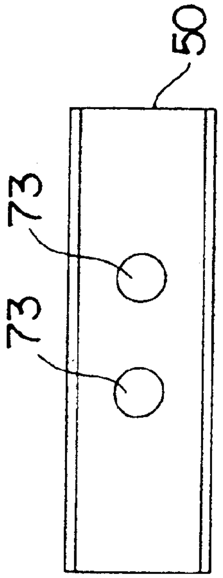
FIG. 12*c* is a top view of the jaw anvil of FIG. 12*a*.

FIG. 12*a* is a perspective view of a jaw anvil according to one embodiment of the present invention. FIG. 12*b* is a front view of the jaw anvil of FIG. 12*a*. FIG. 12*c* is atop view of the jaw anvil of FIG. 12*a*. The jaw anvil 50 comprises a hardened metal block that includes threaded bores 73 in the bottom thereof which are used to mount the jaw anvil 50 to one of the tool seats 49, as discussed above.

Figure 13B:
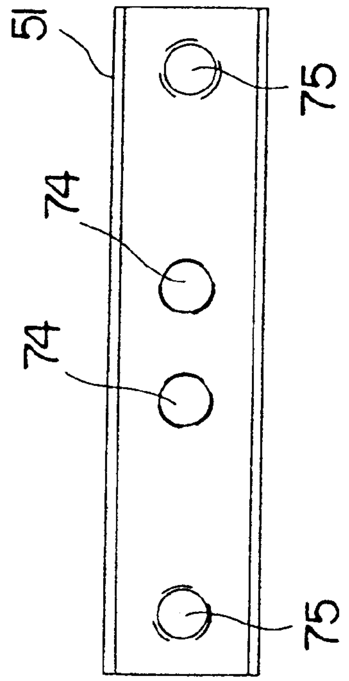
FIG. 13*b* is a front view of the number backing plate of FIG. 13*a*.
Figure 13C:
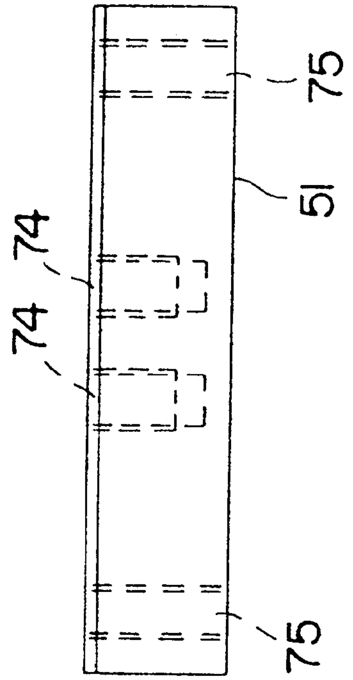
FIG. 13*c* is a top view of the number backing plate of FIG. 13*a*.
Figure 13A:
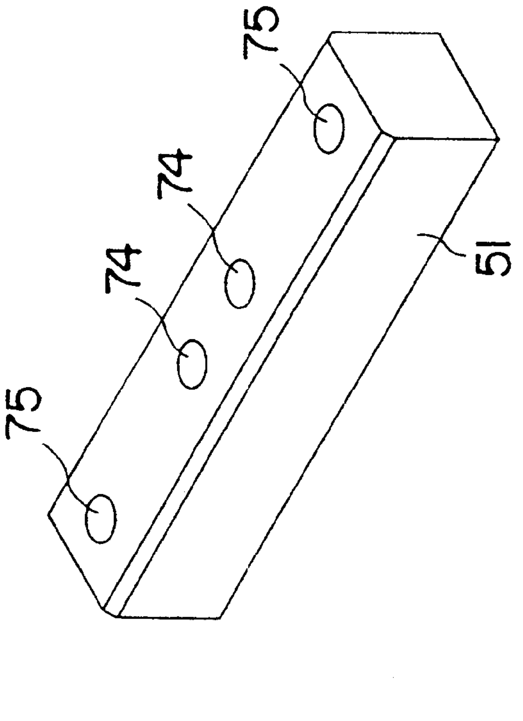
FIG. 13*a* is a perspective view of a number backing plate according to one embodiment of the present invention.

FIG. 13 a is a perspective view of a number backing plate according to one embodiment of the present invention. FIG. 13*b* is a front view of the number backing plate of FIG. 13*a*. FIG. 13*c* is a top view of the number backing plate of FIG. 13*a*. The number backing plate 51 is similar to the jaw anvil 50 in that it is provided with threaded bores 74 by which it can be secured to a tool seat 49. In addition, number backing plate 51 includes through-bores 75. Through-bores 75 are provided to receive mechanical fasteners, e.g., threaded bolts, by which a conventional indicia die set block or similar indicia making die can be attached to number backing plate 51. Since the parts stamper utilizes opposable jaws, at least one of which is pivotal, various tips, other than the jaw anvil and number backing plate, can be attached to the tool seats 49. For example, tips for cutting, crimping, bonding clamping, forming, piercing, bending, swedging, etc. could be used in conjunction with the parts stamper.

Figure 14A:
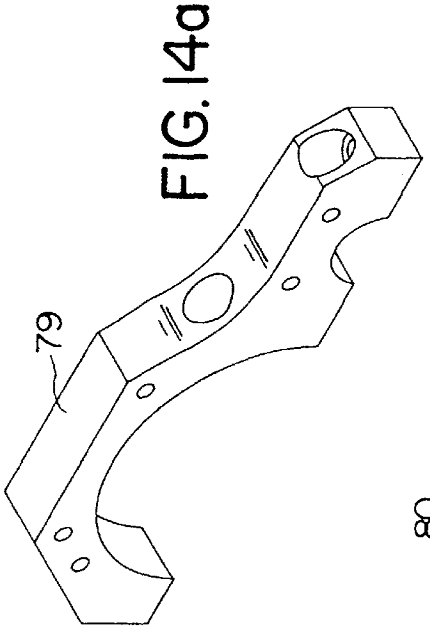
FIG. 14*a* is a perspective view of a mounting bracket according to one embodiment of the present invention.
Figure 14B:
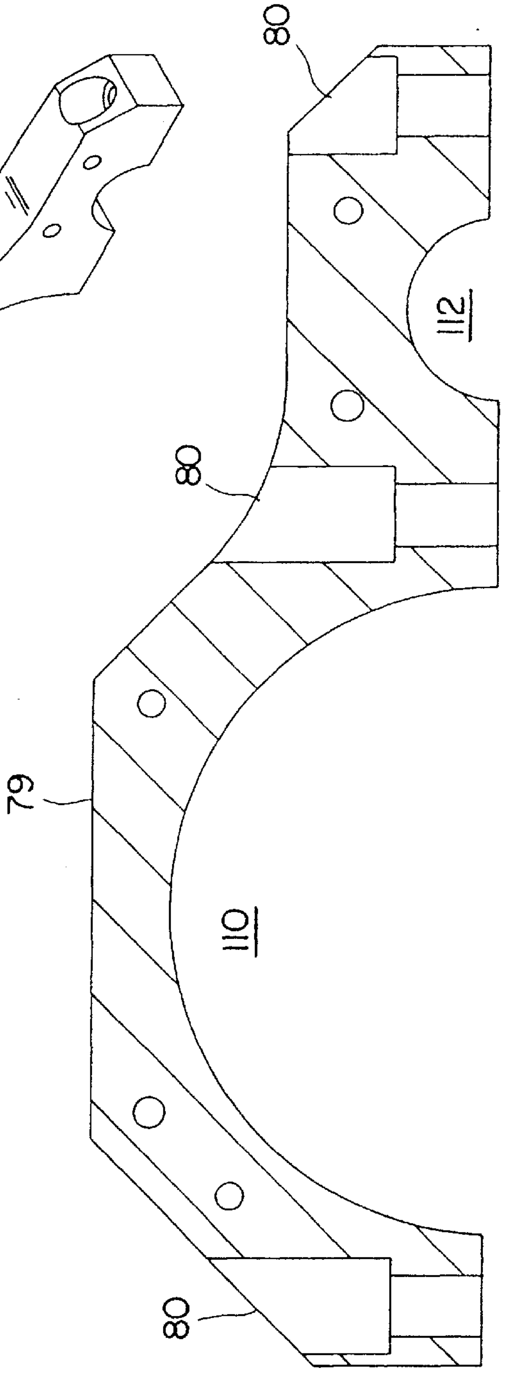
FIG. 14*b* is a top view of the mounting bracket of FIG. 14*a*.
Figure 14C:
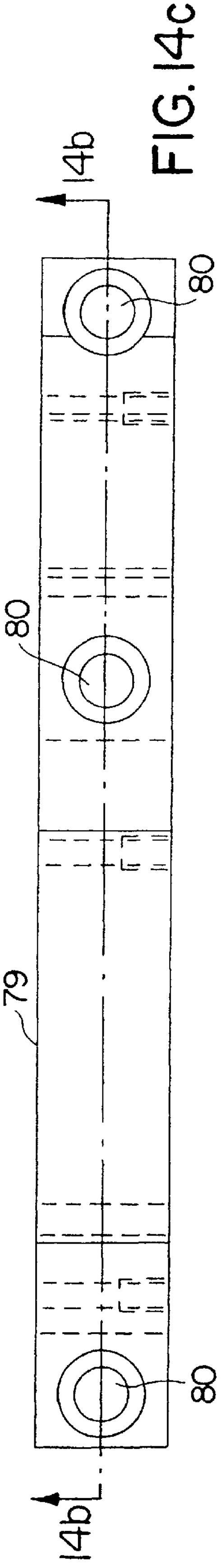
FIG. 14*c* is a side view of the mounting bracket of FIG. 14*c*.

FIG. 14*a* is a perspective view of one-half of a mounting bracket according to one embodiment of the present invention. FIG. 14*b* is a top view of the mounting bracket of FIG. 14*a*. FIG. 14*c* is a side view of the mounting bracket of FIG. 14*c*. The mounting bracket includes half portions which comprise two plate portions 79, which can be secured together by screws or bolts which extend into bores 80 which can include internal-threaded portions on one-half of the mounting bracket. When secured together, mounting plates 79 define an opening 110 which can extend around a narrow cylindrical portion 111 of the body 1 of the parts stamper so that the parts stamper freely rotates with respect to the mounting bracket. The mounting bracket also includes an opening 112 which can receive a spherical collar (not shown) that can be clamped therein in a fixed orientation and used to mount the parts stamper to an articulated or fixed structure.

The use of three bores and three screws or bolts to couple the two plate portions 79 of the mounting bracket together allows for separate loosening and angular adjustment of either the spherical collar or the parts stamper. In this regard, loosening only the screw or bolt at one end of the mounting bracket is sufficient to loosen the adjacent spherical collar or parts stamper, while maintaining the other in a secured manner. This feature allows easy and separate adjustment of the mounting bracket with respect to any support or the parts stamper with respect to the mounting bracket. In order to provide a tighter grip, the spherical collar can have a roughened, e.g., ribbed, grooved, etc., outer surface. Making the spherical collar out of a hard metal and making the two plate portions 79 out of a softer steel or an alloy of aluminum, brass, etc. will also allow better gripping between the two. It is also possible to provide opening 112 with a roughened inner surface.

In an alternative embodiment, a mounting plate or bracket having various arrays of mounting holes can be bolted to the rear and/or either side of the parts stamper body 1, and used to secure the parts stamper to a suitable support structure.

Figure 15:
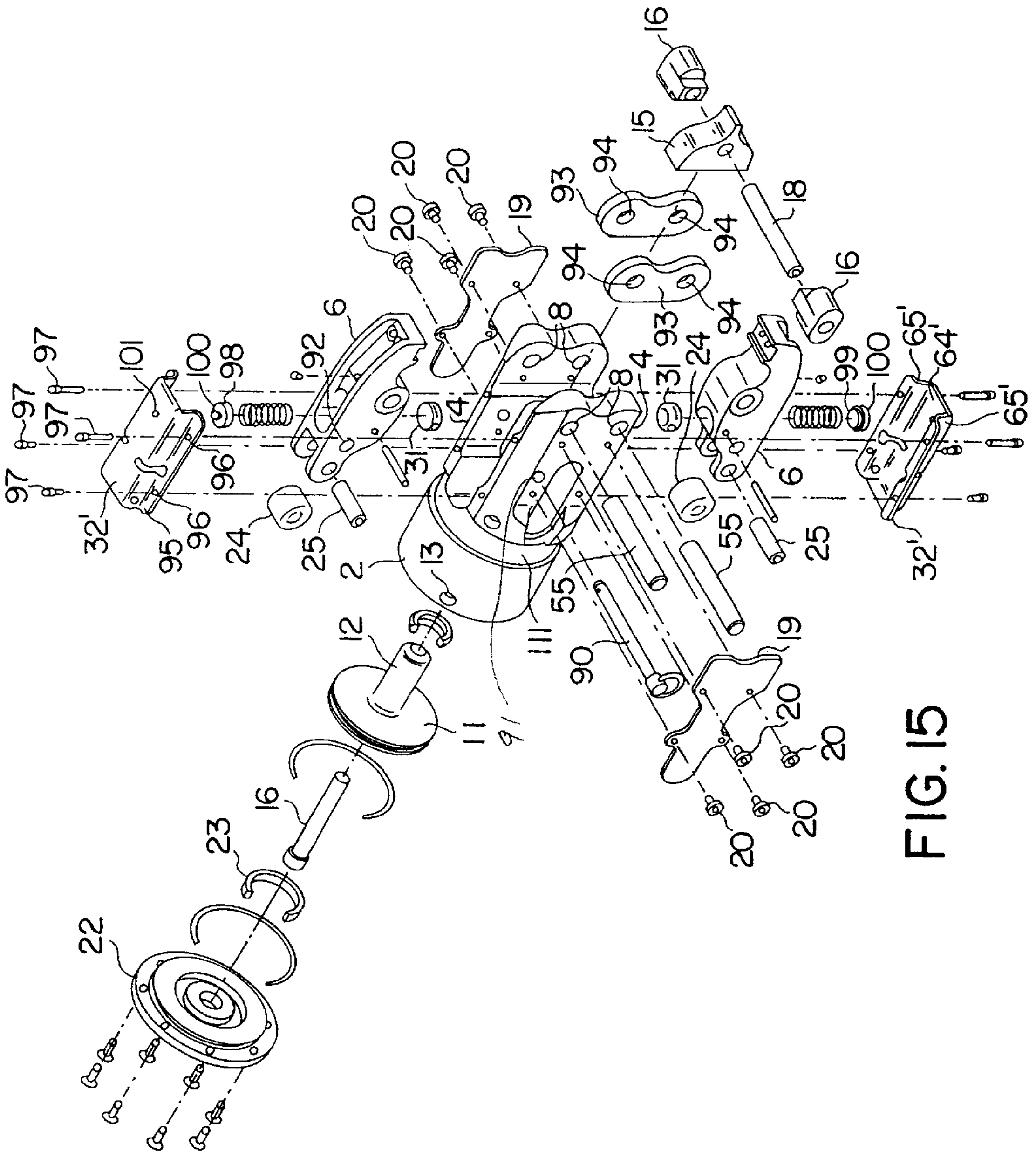
FIG. 15 is an exploded view of a parts stamper according to another embodiment of the present invention.

FIG. 15 is an exploded view of a parts stamper according to another embodiment of the present invention. The embodiment of the parts stamper depicted in FIG. 15 is somewhat similar to the parts stamper depicted in FIG. 1. Among the differences are the shape of the front edges of legs 4 of the yoke structure 3 and the corresponding shape of the impact plates 19, the inclusion of detent pin 90, the inclusion of jaw pivot braces 93, spring covers 32' (compare with spring retainer caps 32), and the inclusion of additional spring retainers 98. It is to be understood that some or all of the different features/elements of the embodiment of the parts stamper of FIG. 15 can be incorporated into the parts stamper depicted in FIG. 1 and in additional embodiments of the parts stamper.

In the embodiment of the invention depicted in FIG. 15, the front edges of legs 4 of the yoke structure 3 are recessed near their centers to provide clearance for a workpiece. Additional workpiece clearance can be obtained by varying the shape of the jaw members as desired to fit onto, around and/or into a workpiece having any given shape. Such variation of the jaw members' shape can include lengthening or shortening the jaw members, changing the curvature or angle of the jaw members, and/or changing the position or angle of the tool seats 49. According to one embodiment, discussed below, the jaw members or tips can be jointed so that they can be adjusted into different angularly positions as required to close about workpieces that may have different shaped edges.

As shown in FIG. 15, the leading edges of impact plates 19 can include recessed center portions in order to provide clearance for a workpiece. The clearance recesses provided in the leading edges of the impact plates 19 can have a similar shape as the recesses in the front edges of the legs 4 the yoke structure 3. In use, the impact plates can be adjusted so that they extend slightly beyond the front edges of the legs 4 of the yoke structure 3 in order to protect the face of the yoke structure 3 from being impacted by articles that are to be stamped.

The parts stamper depicted in FIG. 15 includes a detent pin 90 which can be used to lock the jaw members 6 of the parts stamper into a desired position, e.g., in an open position. The detent pin 90 can comprise any suitable elongated member, e.g., pin, rod, dowel, bolt, etc. The detent pin 90 is received in through-holes 91, 92 provided in the parts stamper body 1 and in at least one of the movable jaw members 6. According to one embodiment, the stamper body 1 is provided with aligned through-holes 91 in each of the legs 4 of the yoke structure 3. A similar through-hole 92 is provided in one of the jaw members 6. The through-holes 91, 92 are located in the parts stamper body 1 and jaw member(s) 6, so that they become aligned when the jaw member(s) 6 are moved into an open position. Once the through-holes 91, 92 are aligned, the detent pin 90 can be inserted into the aligned through-holes 91, 92 and used to secure or lock the jaw member(s) 6 in an open position. The use of the detent pin 90 can allow one to safely change or replace the tips, e.g., jaw anvil 50, number backing plate 51, etc. in tool seats 49 of the jaw members 6.

FIG. 15 depicts an example of jaw pivot braces 93 that can be used in parts stampers according to the present invention. Such jaw pivot braces 93 comprise elements which are made from hardened metals or metal alloys, and are provided to brace against stresses that are transferred between the jaw members 6 and the jaw pivot pins 55 into the legs 4 of yoke structure 3. The jaw pivot braces 93 are inserted between the inside surfaces of legs 4 of the yoke structure 3 and the side edges of the jaw members 6. The jaw pivot braces 93 include through-holes 94 that are aligned with the through-hole 8 in legs 4 of yoke structure 3 which receive jaw pivot pins 55. Thus, jaw pivot pins 55 can be used to secure the jaw pivot braces 93 in position in the parts stamper.

FIG. 15 depicts spring covers 32' which cover and protect a large portion of the opening 5 of the yoke structure 3.

Spring covers 32' can have raised center portions 64' and sides 65' so that they are similar to retainer caps 32 in cross-section, and provide clearance for movement of the jaw members 6, if necessary. In addition, the side 65' can be provided with feet 95 having holes 96 therein by which the spring covers 32' can be secured to the sides of legs 4 of the yoke structure 3 by suitable mechanical fasteners 97.

Spring retainers 98 can be used to secure outer ends of spring elements 26. One side of spring retainers 98 can include a circular protruding portion 99 which can be received within an end of spring elements 26. The other side of spring retainers 32' can include a smaller protruding structure or structures 100 which can engage in a complimentarily-shaped hole or recess 101 formed in the spring covers 32'. In alternative embodiments, the spring retainers 32' can have circular recessed portions which receive ends of spring elements 26 and/or recesses which engage complimentarily-shaped projecting structures formed on the recessed center portions 64 of the spring covers 32'.

Figure 16A:
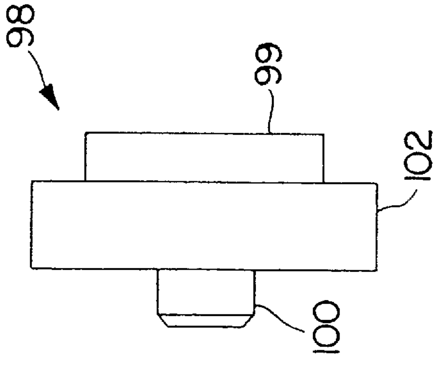
FIG. 16*a* is a cross-sectional view of the spring retainer according to one embodiment of the present invention.
Figure 16B:
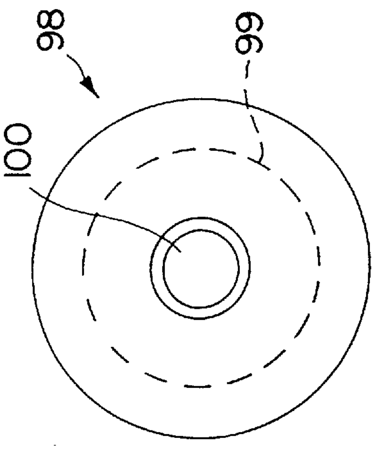
FIG. 16*b* is an end view of the spring retainer of FIG. 16*a*.

FIG. 16*a* is a cross-sectional view of the spring retainer according to one embodiment of the present invention. FIG. 16*b* is an end view of the spring retainer of FIG. 16*a*. As depicted in FIGS. 16*a* and 16*b*, the spring retainer 98 includes a central portion 102 which can be circular, square, or have any other convenient shape, and a circular protruding portion 99 which is dimensioned to be received in an end of spring element 26. The spring retainer 32' also includes a smaller protruding structure 100 which is engageable with a complimentarily-shaped hole or recess 101 in the central portion 64' of the spring covers 32'.

Figure 17:
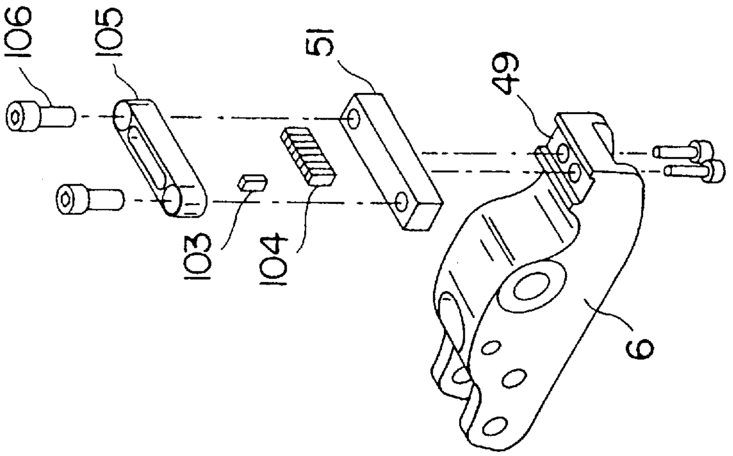
FIG. 17 is an exploded perspective view which depicts how indicia dies are secured to a jaw member using a number backing plate 51.

FIG. 17 is an exploded perspective view which depicts how indicia dies are secured to a jaw member using a number backing plate 51. As depicted, a number backing plate 51 is secured in tool seat 49 of jaw member 6. A die 103 or set of dies 104 is secured on number backing plate 51 by retainer 105 which is secured to number backing plate 51 by fasteners 106.

Figure 18:
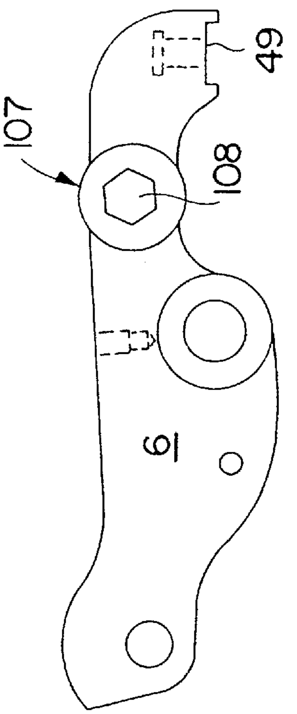
FIG. 18 depicts an embodiment of a jaw member which has an adjustable joint whereby the angle of the free end of the jaw member can be adjusted.

FIG. 18 depicts an embodiment of a jaw member which has an adjustable joint whereby the angle of the free end of the jaw member can be adjusted. The jaw members of the present invention can be made angularly adjustable by providing them with a joint structure which can be secured or fixed in a desired position. In FIG. 18, jaw member is depicted as having a joint 107 which allows the angle of the jaw member to be adjusted. In order to fix or secure the jaw member in a desired angle, the coupled portions of joint structure 107 can be provided with engageable structure such as teeth that allow incremental adjustment, or engaging tapers that allow infinite adjustment when clamped rigidly together by bolts 108.

Figure 19:
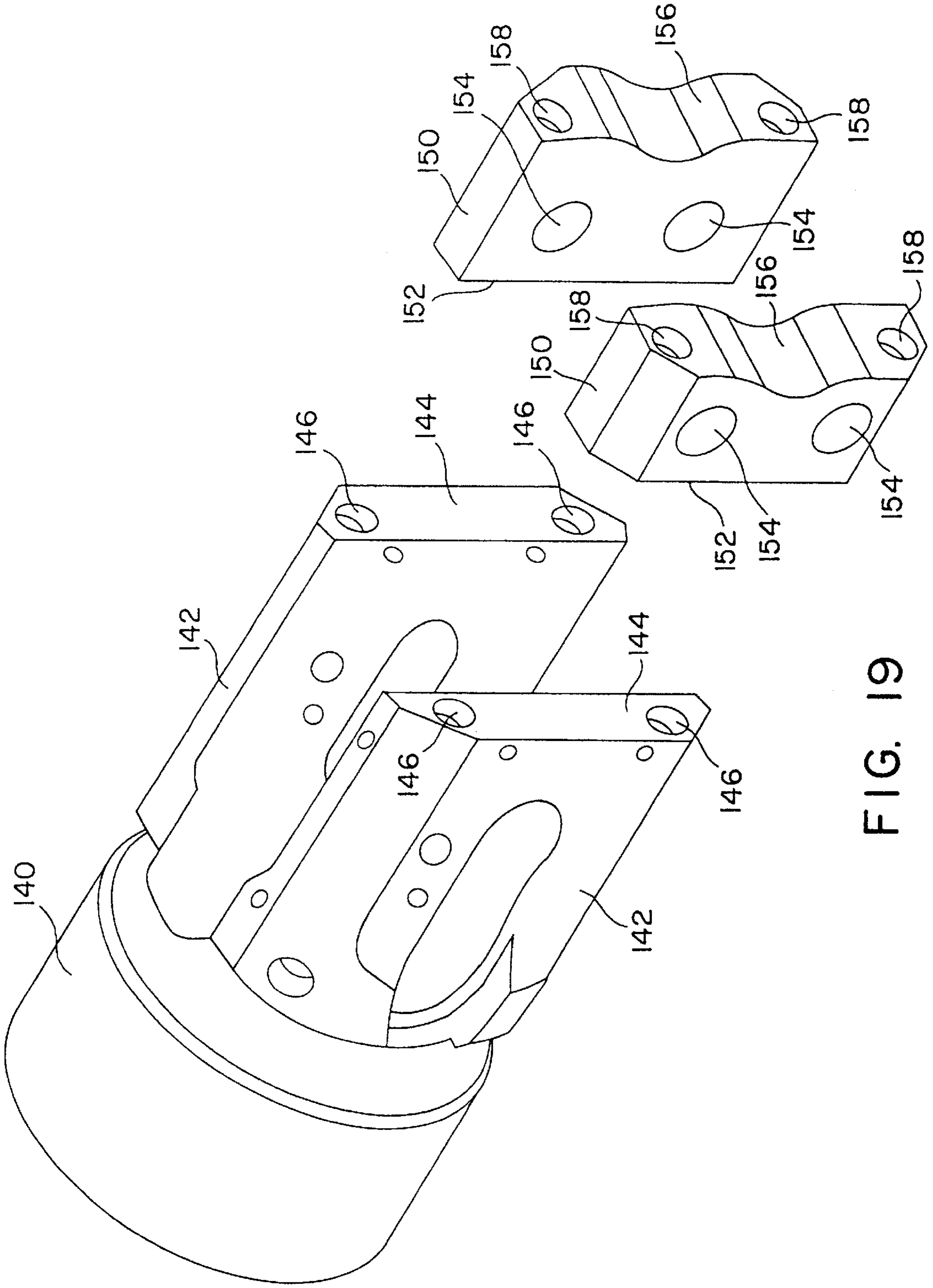
FIG. 19 is a perspective view of a stamper body with a pair of bushing blocks.

FIG. 19 depicts an embodiment of a stamper body assembly which includes a stamper body and a pair of bushing blocks. Stamper body 140 includes a yoke structure 3 with a pair of legs 142. Front edges 144 of legs 142 are flat and include threaded holes 146 to mate with bushing blocks 150. Bushing blocks 150 are machined from steel bar stock and heat treated after machining and are provided to improve the performance of the stamper body assembly against the stresses that are transferred between jaw members 6 and jaw pivot pins 55 (see FIG. 15) into legs 142 of the yoke structure 3 of stamper body 140. As shown in FIG. 19, bushing blocks 150 include through-holes 154 to receive jaw pivot pins 55. Front edges 156 of blocks 150 include recessed center portions in order to provide clearance for a workpiece and through-holes 158. Back edges 152 of blocks 150 are flat to mate with front edges 144 of legs 142. Through-holes 158 in blocks 150 align with threaded holes 146 of stamper body 140 to allow fasteners (not shown) having threads on a distal end to be inserted through through-holes 158 into threaded hole 146 to attach block 150 to stamper body 140.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as set forth in the attached claims.

What is claimed:

1. A parts stamper which comprises:

a body having a yoke structure defined at one end by a pair of spaced-apart wall members and an actuator at an opposite end;

a pair of opposable jaw members, each jaw member including a cam roller bearing at one end and a tool seat at an opposite end;

a cam element which contacts the cam roller bearings of the pair of jaw members;

a linkage structure driven by the actuator and coupled by the cam element;

an anvil attached to the tip seat of one the opposable jaw members; and a removable die assembly mounted to the tool seat of the other of the opposable jaw members;

wherein the die assembly having indicia affixed thereon; and wherein at least a portion of the anvil is configured to provide a resistance force against the indicia when the pair of opposable jaw members are in a clamped position.

2. The parts stamper according to claim 1, wherein the removable die assembly comprises a die set block and a number backing plate.

3. The parts stamper according to claim 2, wherein the number backing plate includes a first pair of threaded bores for mounting the die set block to the number backing plate and a second pair of threaded bores for mounting the mounting backing plate to the tool seat of the jaw member.

4. The parts stamper according to claim 2, wherein the die set block includes at least one die and a retainer to secure the die to the number backing plate.

5. The parts stamper according to claim 1, wherein one of the spaced-apart wall members has a hole disposed therethrough, and wherein one of the jaw members has a hole disposed therethrough, such that a detent pin is extendable through the hole of the one of the spaced-apart wall members and the hole of the one of the jaw members to selectively fix the one of the jaw members relative to the one of the spaced-apart wall-members.

6. A parts stamper which comprises:

a body having a yoke structure defined at one end by a pair of spaced-apart wall members and an actuator at an opposite end;

a pair of opposable jaw members, each jaw member including a tool seat; and a removable die assembly mounted to the tool seat of one jaw member;

wherein the removable die assembly comprising a number backing plate attached to one jaw member and a die set block attached to the number backing plate; and wherein the die set block having indicia extending therefrom, such that when applied to a workpiece surface, the indicia is impressed into the workpiece surface to create an impressed portion thereon in which the impressed portion is a reproduction of the indicia.

7. The parts stamper according to claim 6, further comprising an anvil mounted to the tool seat of the other jaw member.

8. The parts stamper according to claim 6, wherein the number backing plate includes a first pair of threaded bores for mounting the die set block to the number backing plate and a second pair of threaded bores for mounting the mounting backing plate to the tool seat of the jaw member.

9. The parts stamper according to claim 8, further comprising a plurality of threaded fasteners to attach the die set block to the number backing plate and the number backing plate to the tool seat of the jaw member.

10. The parts stamper of claim 6, wherein the die set block includes at least one die and a retainer to secure the die to the number backing plate.

* * * * *